United States Patent
Kangas et al.

(10) Patent No.: US 11,290,371 B2
(45) Date of Patent: *Mar. 29, 2022

(54) METHODS AND APPARATUSES FOR PATH SELECTION IN A PACKET NETWORK

(71) Applicant: Coriant Operations, Inc., Naperville, IL (US)

(72) Inventors: Bradley R. Kangas, Saint Charles, IL (US); Anoop J. Mathew, Woodridge, IL (US); Jai Harpalani, Naperville, IL (US); James N. Turner, Lombard, IL (US); Mark A. Richmond, Downers Grove, IL (US); Kenneth S. Mizialko, Naperville, IL (US)

(73) Assignee: Coriant Operations, Inc., Naperville, IL (US)

( * ) Notice: Subject to any disclaimer, the term of this patent is extended or adjusted under 35 U.S.C. 154(b) by 452 days.

This patent is subject to a terminal disclaimer.

(21) Appl. No.: 16/230,610

(22) Filed: Dec. 21, 2018

(65) Prior Publication Data
US 2019/0253340 A1 Aug. 15, 2019

Related U.S. Application Data

(60) Continuation of application No. 14/844,605, filed on Sep. 3, 2015, now Pat. No. 10,181,998, which is a (Continued)

(51) Int. Cl.
*H04L 12/729* (2013.01)
*H04L 45/125* (2022.01)
(Continued)

(52) U.S. Cl.
CPC .......... *H04L 45/125* (2013.01); *H04L 45/24* (2013.01); *H04L 45/28* (2013.01);
(Continued)

(58) Field of Classification Search
CPC ....... H04L 45/125; H04L 45/24; H04L 45/28; H04Q 3/13003; H04Q 2213/1301;
(Continued)

(56) References Cited

U.S. PATENT DOCUMENTS

| | | | | |
|---|---|---|---|---|
| 5,822,299 A | * | 10/1998 | Goodman | H04J 3/14 370/228 |
| 6,657,969 B1 | * | 12/2003 | Neuendorff | H04L 12/437 370/245 |

(Continued)

FOREIGN PATENT DOCUMENTS

WO 2006/014615 A2 2/2006

OTHER PUBLICATIONS

Von Herzen, et al., "TFI-5: TDM Fabric to Framer Interface Implementation Agreement," Optical Internetworking Forum, pp. 71, Sep. 16, 2003.

*Primary Examiner* — Samina F Choudhry (57) ABSTRACT

Embodiments including methods, systems, and apparatuses for distributing, processing, and reacting to path information distributed via a service-agnostic packet fabric for the purpose of enabling path selection are disclosed. By configuring two ingress line cards to send path quality words to each other via the switch fabric, compare the path quality words, and determine whether to transmit traffic to an egress line card via the switch fabric based on the comparison of the path quality words, the embodiments enable a central switch fabric to be unaware of the paths that it carries, and enable both ingress and egress bandwidth of the switch fabric to be sized according to the facilities for which it is terminating. The switch fabric does not need to support working and protection paths simultaneously in some embodiments, allowing it to be scaled appropriately to termination facilities.

23 Claims, 12 Drawing Sheets

Related U.S. Application Data division of application No. 12/945,382, filed on Nov. 12, 2010, now Pat. No. 9,178,804.

(51) Int. Cl.
*H04L 45/24* (2022.01)
*H04L 45/28* (2022.01)
*H04Q 3/545* (2006.01)

(52) U.S. Cl.
CPC . *H04Q 3/54558* (2013.01); *H04Q 2213/1301* (2013.01); *H04Q 2213/1302* (2013.01); *H04Q 2213/13003* (2013.01); *H04Q 2213/1304* (2013.01); *H04Q 2213/1336* (2013.01); *H04Q 2213/13166* (2013.01); *H04Q 2213/13292* (2013.01)

(58) Field of Classification Search
CPC ... H04Q 2213/1302; H04Q 2213/1304; H04Q 3/54558
See application file for complete search history.

(56) References Cited

U.S. PATENT DOCUMENTS

| | | | |
|---|---|---|---|
| 7,130,263 B1 | 10/2006 | Ong et al. | |
| 7,275,103 B1 | 9/2007 | Thrasher et al. | |
| 9,178,804 B2 | 11/2015 | Kangas et al. | |
| 2002/0103921 A1* | 8/2002 | Nair | H04L 45/00 709/232 |
| 2002/0176131 A1* | 11/2002 | Walters | H04L 41/044 398/58 |
| 2012/0106562 A1 | 5/2012 | Laor et al. | |

\* cited by examiner

METHODS AND APPARATUSES FOR PATH SELECTION IN A PACKET NETWORK

RELATED APPLICATION

This application is a continuation of U.S. application Ser. No. 14/844,605, filed Sep. 3, 2015, which is a divisional of U.S. application Ser. No. 12/945,382, filed Nov. 12, 2010, now U.S. Pat. No. 9,178,804, issued Nov. 3, 2015. The entire teachings of the above applications are incorporated herein by reference.

BACKGROUND OF THE INVENTION

Path and line selection for protection in a network, such as, for example, a Synchronous Optical Networking (SONET)/Synchronous Digital Hierarchy (SDH) network, has historically been accomplished via selection in a central switch fabric or data ingress or egress of a port card.

Historically, switch fabrics have been built with specific technology for the signals it is expected to switch. Depending on the approach, many Time-Division Multiplexing (TDM) switch fabrics employ protection selection at an ingress, central switch fabric, or egress, which involves building bandwidth-scaled switch fabrics.

Ingress selection typically relies on a fixed physical relationship between line cards and the exchanging of TDM signals external to the central fabric. Egress protection selection provide flexible protection associations; however, they require building fabrics with extra capacity to support switching of at least two paths to an egress line card. Central fabric selection is a versatile approach; however, for fast switch-over times, the fabric must be built with protocol awareness and the ability to detect and react to protection switches quickly.

For generic packet-based switches carrying TDM signals, the central switch fabric is unaware of the services that it carries and is unable to make any decisions as to the selection of a protected data path.

SUMMARY OF THE INVENTION

Sharing of line and path information between ingress line cards enables a protection selection to be made between two or more peer line cards at the ingress to a packet switch fabric. Switch fabric multicast capability can be used to exchange protected line and path information and enables a flexible relationship between line cards with protected paths. This limits the bandwidth required by the switch fabric because path selection is performed prior to switching.

An example embodiment of the present invention is a switching domain that includes a switch fabric and first and second ingress line cards. Each line card sends quality words to each other via the switch fabric. The line cards then compare the quality words and determine whether to transmit traffic to a third line card via the switch fabric based on the comparison.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Disclosed embodiments include methods, systems, and apparatuses for distributing, processing, and reacting to path information distributed via a service-agnostic packet fabric for the purpose of enabling path selection. Embodiments may serve as a protected data path selection mechanisms for, for example, SONET/SDH or Optical Transport Network (OTN) TDM signals adapted to packets and switched by a packet switch fabric. The embodiments enable establishment of a messaging structure and processing between modules carrying working and protection paths, and enable path protection selection at a path ingress module by controlling which ingress data stream is transmitted to an egress path via the packet switch fabric. In some embodiments, the egress path module is unaware of the processing behind the ingress path selection. The embodiments enable use of a central switch fabric that is unaware of the paths that it carries. Both ingress and egress bandwidth of the switch fabric are sized according to the facilities for which it terminates. The switch fabric does not need to support extra bandwidth for switching working and protection paths simultaneous.

Figure 1:
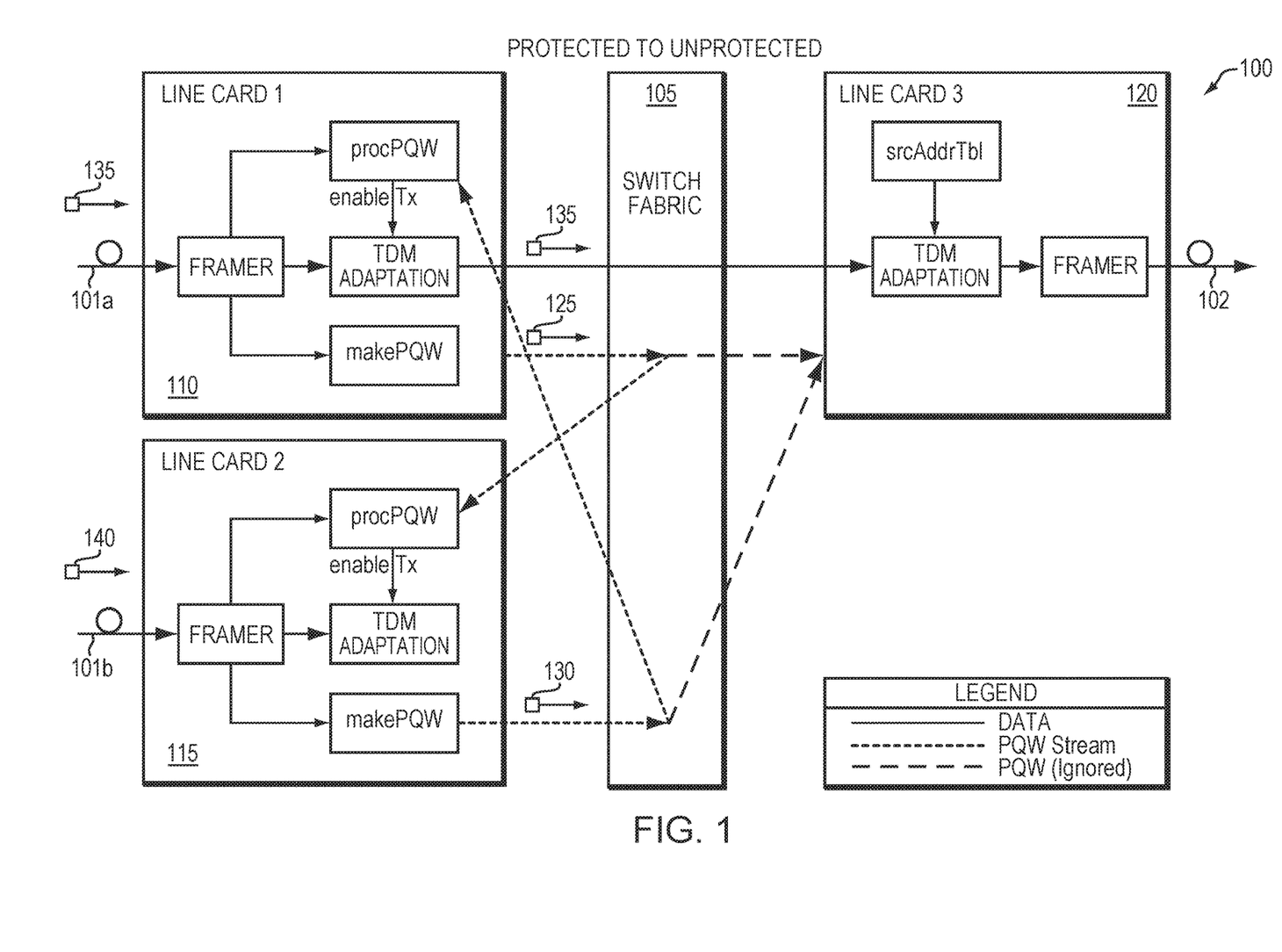
FIG. 1 is a block diagram illustrating a switching domain including two protected ingress paths switched to an unprotected egress path. The figure only shows data flow in one direction.

FIG. 1 is a block diagram illustrating a switching domain 100 that includes two protected ingress paths 101a,b switched to an unprotected egress path 102, according to an example embodiment of the present invention. The switching domain 100 includes a switch fabric 105 and first and second ingress line cards 110, 115. Each line card 110, 115 is configured to send path quality words (PQWs) or messages (PQMs) including one or more PQWs 125, 130 to each other via the switch fabric 105. In some embodiments, PQMs may be referred to as Path Quality Words (PQWs) where each message includes one path quality word (PQW). In other embodiments, each PQM may include one or more PQWs. As an example, if there were 192 source addresses and 192 corresponding PQWs, a given PQM may include 24 PQWs, and 8 PQMs would be used for the 192 PQWs. In embodiments where the PQMs include multiple PQWs, each of the line card may parse the PQMs and extract the PQWs relevant to the particular line card. As used herein, the terms PQW and PQM may be used interchangeably.

Each of the line cards 110, 115 compares the PQWs 125, 130 and determines whether to transmit traffic 135, 140 to a third (e.g., egress) line card 120 via the switch fabric 105 based on the comparison of the PQWs 125, 130. In another embodiment, only one of the line cards 110, 115 compares the PQWs 125, 130 and notifies the other one of the line cards 110, 115 of the result in some manner, such as in the form of a status notification or command of what the other line card is to do, such as transmit or not transmit its received traffic 135, 140.

The PQWs 125, 130 may represent the quality of received ingress traffic 135, 140 over, for example, a protected path or line 101a,b. Each ingress line card 110, 115 may multicast its PQW 125, 130 to all other line cards in the switching domain 100, and, in some embodiments, only one of the two line cards transmits traffic for a protected path, where each line card (e.g., 110) determines independently whether to transmit traffic (e.g., 135) based on whether the PQW it sent (e.g., 125) represents a higher path quality than the PQW (e.g., 130) sent by the other of the first and second line cards (e.g., 115). Additionally, each line card 110, 115 may transmit traffic 135, 140 for a protected path if a PQW is not received from the other of the first and second line cards within a predetermined interval. The third (e.g., egress) line card 120 may accept traffic from either ingress line card 110, 115.

Example embodiments may have the following components: (1) definition of a path quality word (PQW) to be distributed through the packet fabric, (2) distribution of PQWs using, for example, multicast addressing, (3) ingress PQW processing, and (4) egress processing.

The meaning of the fields of a PQW, or PQM that may include one or more PQWs, may relate to hardware sensed path defects. They may also include software-based fields for dynamic communications between path end points, and include source addressing of path or line terminations. In some embodiments, a PQW is created at each path ingress (e.g., at two ingress line cards), is distributed by the fabric, and is mutually monitored at the path ingress modules (e.g., at the two ingress line cards). The PQW may include a source address based on physical facility, an alarm priority based on a detected path or line defect, a software-defined field, a transmit enable indicator, or a message validity indicator.

A source address may denote a shelf, slot, facility number, and path identifier, and may be used to identify incoming PQWs to process. An alarm priority may be a number corresponding to the severity of a signal defect or in-band forced protection switching, where higher severities may correspond to higher alarm priority numbers, in which case the path with the lower alarm priority may be selected as the selected path. For example, a "loss of signal" may have priority level 3, "alarm indication signal" (AIS) may have priority level 2, "signal degrade" or "forced protection switch" may have priority level 1, and "no defect" may have priority level 0. A software-defined field may be populated by an application and used to communicate information between path ingress and egress points. For example, software-defined bits may be used to initiate ingress path selection manually. Ties may be decided based on a predetermined algorithm. A "transmit enable" indicator may indicate whether the source address is transmitting traffic to the path egress, and a "message validity" indicator may indicate the "sanity" of the message, in which case any messages without a message validity indicator will not be processed.

The distribution of PQWs may be by multicast addressing and may include batching of PQWs into a single PQM. As described above, PQWs may be batched together in a single packet and distributed to all switching modules using a single multicast address. Each packet may have a normalized batch address indicating a relative path identifier consisting of, for example, a shelf, slot, and path identifier. The normalized path identifier may be used for filtering PQWs received from remote sources for protected paths. Further, the PQWs may have a period of, for example, 1 to 5 milliseconds to facilitate path protection switches in less than 50 milliseconds.

Ingress PQW processing may involve mutual path selection between protected sources by implementing an automatic squelching mechanism for the deselected path to enable quicker and unsynchronized path selection changes. Ingress PQW processing may involve creating a PQW and distributing it via a multicast address, monitoring for PQWs from a remote working/protection path, reacting to changing PQWs from the remote path, and selecting a path over which to transmit traffic to an egress module.

In some embodiments, each line card associated with a protected ingress path monitors PQWs generated for the local path and compares them to received PQWs for a remote path. The remote path may be identified by its source address. Thus, for each ingress path, there may be two PQWs to monitor: a local and remote PQW. For each ingress path, the PQW's alarm severity, for example, may be monitored, and the path with the lower severity is enabled for transmission to the path egress point. If both paths have the same severity level, then a path designated by provisioning or arbitration, for example, may be selected for transmission to the egress path.

Selection may depend on working/protection designation, "hold off", and "wait to restore" configurations. Additionally, a "watchdog" function may be used to select a protection path when there is a working path failure. Each line card may perform the watchdog function and begin transmitting traffic to the egress line card upon detecting a loss of PQWs from an associated working/protection path or detection of a selected source ceasing to transmit via a PQW or PQM "transmit enabled" field. If the selected ingress path changes by any of the above mechanisms, the "working" path transmission may be automatically squelched, and the transmit enabled indication may be cleared. In this case, the "protecting" line card may also determine that it is then the better path source and begin transmitting traffic to the path egress without coordinating with the original "working" path line card, thus, enabling quicker protection switches.

Egress processing may include multiple-source-address lookup to enable receiving traffic from either the working or protection path. Source addressing may be used when associating an egress path with an ingress path. For example, the processing for each egress path may be programmed with two or more possible source addresses; thus, when path selection is performed at the ingress, there is no additional programming required at the path egress.

Continuing to refer to FIG. 1, FIG. 1 illustrates an example of using PQWs for cross-connecting protected paths on Line Card 1 110 and Line Card 2 115 to a single egress path on Line Card 3 120. FIG. 1 illustrates a protected-to-unprotected cross-connection. For each path 101a,b switched through the switch fabric 105, PQWs 125, 130 are exchanged between Line Cards 1 and 2 110, 115 for the protected ingress paths 101a,b. These source line cards 110, 115 compare their local PQW (e.g., 125) with a received remote PQW (e.g., 130) and choose the path with the best quality based on, for example, an alarm severity.

In the illustrated example, Line Card 1 110 has the selected ingress path and transmits a data stream 135 to the egress path on Line Card 3 120. The egress Line Card 3 120 is capable of receiving data from either Line Card 1 or 2 110, 115. As described above, Line Cards 1 and 2 110, 115 may use a "transmit enable" indicator and automatic squelching (e.g., disabling an output) to coordinate which line card transmits traffic to path egress Line Card 3 120. The switch fabric 105 may multicast PQWs 125, 130 from a source line card to all other line cards, although the PQWs 125, 130 may only be processed by the ingress line cards 110, 115 and ignored by other line cards.

In the example embodiment of FIG. 1, only one ingress line card (125 or 130) transmits traffic to the egress line card 120. No path selection occurs in the switch fabric 105 or at the egress line card 120. When the egress path 102 is unprotected, as in FIG. 1, a unicast address may be used through the packet fabric 105 to transmit the traffic 135, 140. When the egress path is protected, as in FIG. 2, a multicast address may be used to connect a single selected ingress path to multiple egress paths. Note that this multicasting may be in addition to optional multicasting of the PQWs shared between or among ingress line cards 110, 115.

Figure 2:
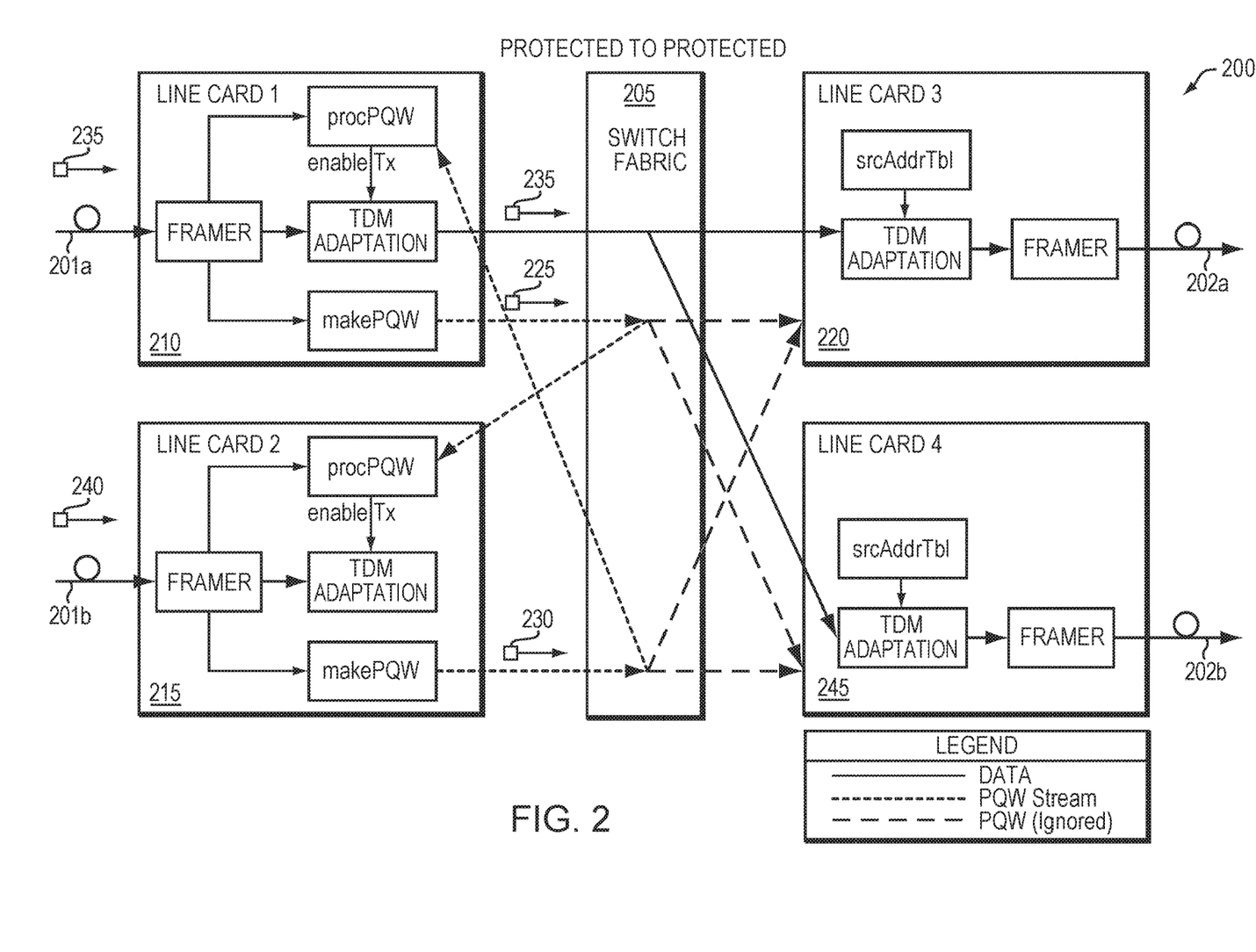
FIG. 2 is a block diagram illustrating a switching domain including two protected ingress paths switched to two protected egress paths. The figure only shows data flow in one direction.

FIG. 2 is a block diagram illustrating a switching domain 200 similar to that of FIG. 1, but including two protected ingress paths 201a,b switched to two protected egress paths 202a,b, according to an example embodiment of the present invention. The switching domain 200 of FIG. 2 illustrates an example of using PQWs 225, 230 for cross-connecting protected paths 201a,b on Line Cards 1 and 2 210, 215 to protected paths 202a,b on Line Cards 3 and 4 220, 245. It should be appreciated that FIGS. 1 and 2 illustrate a unidirectional example, and that other embodiments may implement path selection in both directions. For the embodiment of FIG. 2, PQW processing and exchange between the source and protected paths are as described above for FIG. 1, but in FIG. 2, the packet fabric 205 uses multicast addresses to transmit traffic 235, 240 through the packet fabric 205. Thus, an ingress line card 210, 215 transmits its traffic 235, 240 to multiple egress line cards 220, 245. As in the example embodiment described above for FIG. 1, only one line card acts as a data source for the egress paths. Line Cards 3 and 4 220, 245 are both configured to receive traffic from either Line Cards 1 or 2 210, 215.

Figure 3A:
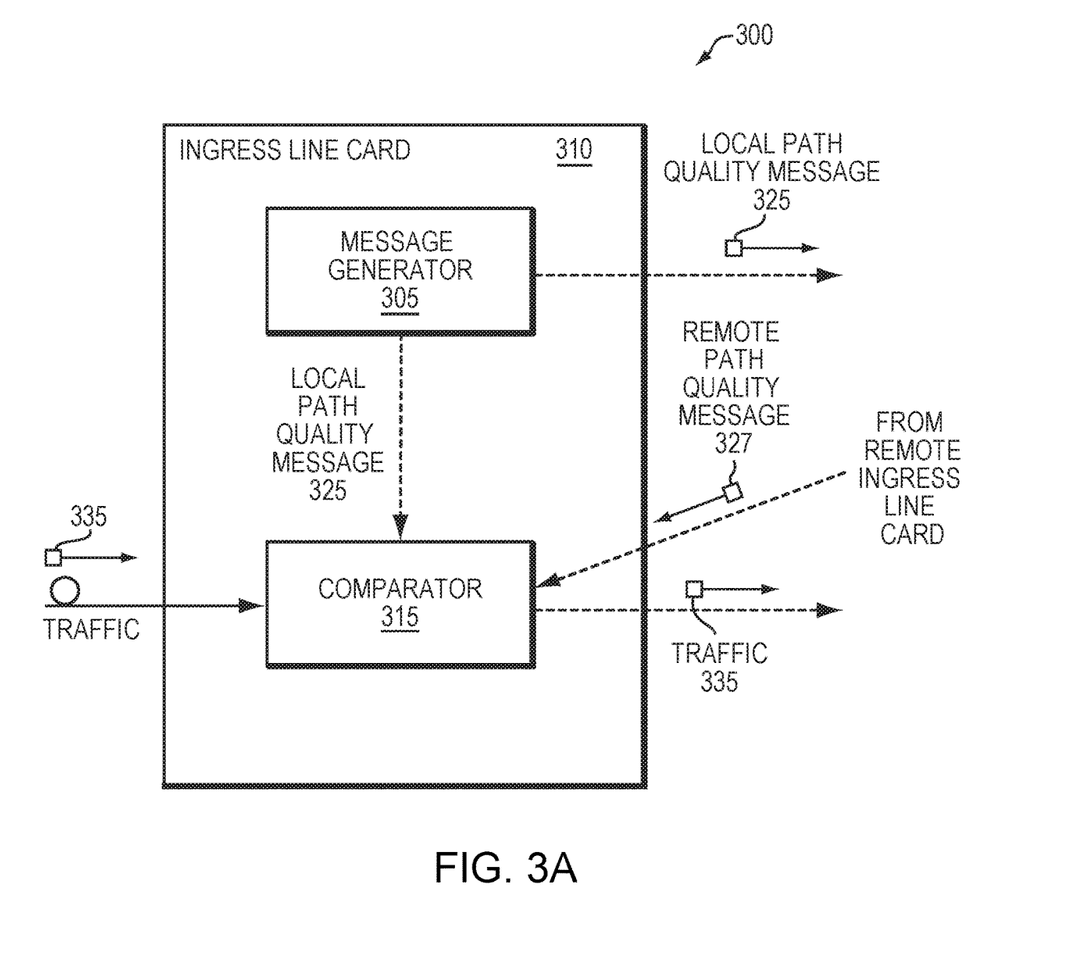
FIG. 3A is a block diagram illustrating a line card processing an ingress TDM path and including a message generator and a comparator.

FIG. 3A is a block diagram 300 illustrating a line card 310 processing an ingress TDM path and including a message generator 305 and a comparator 315, according to an example embodiment of the present invention. According to the example embodiment, the line card 310 is an ingress line card that includes a word generator 305 that generates a local PQW 325 and sends the local PQW 325 to a remote ingress line card via a switch fabric. In at least one embodiment, if the ingress line cards are located close enough, direct communications (independent of a switch fabric) can alternatively be done. The ingress line card 310 also includes a comparator 315 that compares the local PQW 325 to a remote PQW 327 received from the remote ingress line card and that determines whether to transmit traffic 335 based on a comparison of the local and remote PQWs 325, 327. The line card 310 may also include a selector that enables or disables the transmission of traffic 335 based on the determination made by the comparator 315.

The local and remote PQWs 325, 327 may represent the quality of received ingress traffic at the ingress line cards, respectively. Further, the ingress line card 310 may multicast the local PQW 325 to all other line cards in operative communication with the switch fabric. The ingress line card 310 may then determine independently whether to transmit traffic 335 based on whether the local PQW 325 represents a higher path quality than the remote PQW 327. In the absence of a remote PQW 327, e.g., if the remote PQW 327 is not received from the remote line card, for example, within a predetermined interval, the ingress line card 310 may transmit traffic 335 for its protected path. A description of the multicasting procedure is presented below in reference to FIGS. 5 and 6.

Figure 3B:
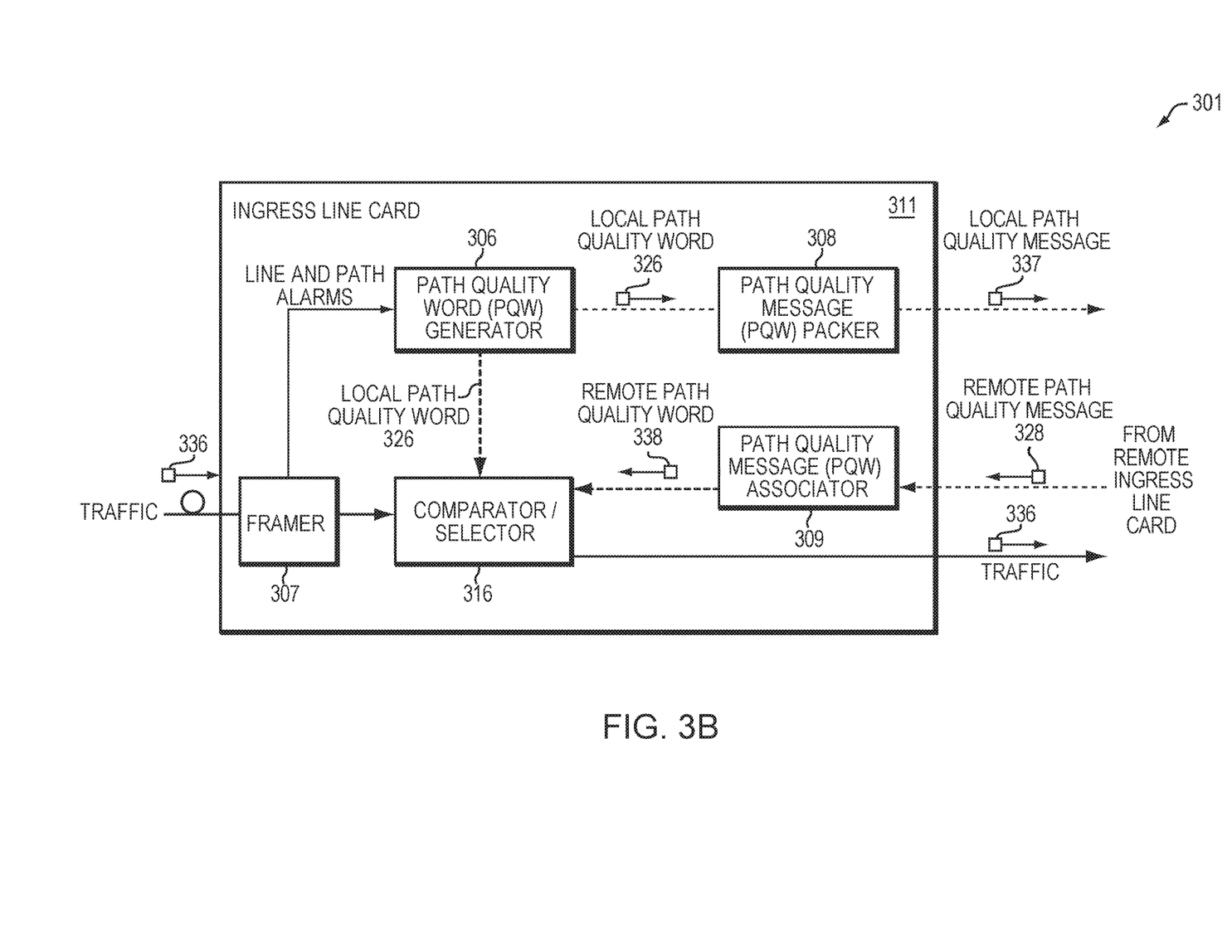
FIG. 3B is a detailed block diagram illustrating a line card processing an ingress TDM path and including a message generator and a comparator.

FIG. 3B is a detailed block diagram 301, similar to FIG. 3A, illustrating a line card 311 processing an ingress TDM path and including a PQW generator 306 and a comparator/selector 316, according to an example embodiment of the present invention. According to the example embodiment, PQW generator 306 generates a local PQW 326 and sends the local PQW 326 to a remote ingress line card via a switch fabric. On the way to the switch fabric, the local PQW 326 may be packed into a PQM 337 by a PQM packer 308 for efficiency. The comparator/selector 316 compares the local PQW 326 to a remote PQW 338 received from the remote ingress line card and that determines whether to transmit traffic 336 based on a comparison of the local and remote PQWs 326, 338. The remote PQW 338 may be extracted from a remote PQM 328 by a PQM associator 309. The selector enables or disables the transmission of traffic 336 based on the determination made by the comparator.

Figure 4A:
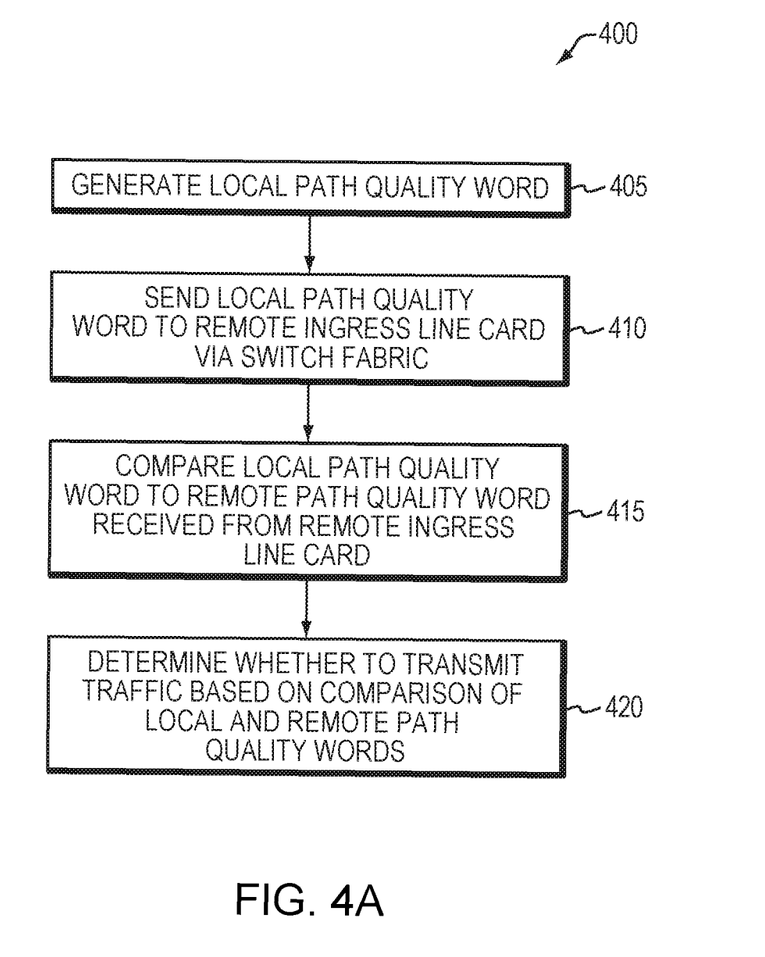
FIG. 4A is a flow diagram illustrating an embodiment of a procedure line cards can use to determine whether to transmit traffic based on a comparison of path quality words.

FIG. 4A is a flow diagram 400 illustrating how line cards, such as the ingress line card 310 of FIG. 3, can determine whether to transmit traffic based on a comparison of PQWs, according to an example embodiment of the present invention. According to the example embodiment, a method 400 of an ingress line card's switching traffic includes generating a local PQW (405) and sending the local PQW to a remote ingress line card via a switch fabric (410). The method further includes comparing the local PQW to a remote PQW received from the remote ingress line card (415) and then determining whether to transmit traffic to the switch fabric based on the comparison of the local and remote PQWs (420).

As in the above embodiments, the local PQW may represent the quality of received ingress traffic, sending the local PQW (410) may include multicasting or broadcasting the local PQW to all other line cards in operative communication with the switch fabric, determining whether to transmit traffic (420) may include independently determining whether to transmit traffic based on whether the local PQW represents a higher path quality than the remote PQW, and determining whether to transmit traffic (420) may include transmitting traffic if the remote PQW is not received from the remote line card within a predetermined interval, for example. Additionally, after the determination, the line card's traffic may be squelched if it is determined that it is not to transmit traffic.

Figure 4B:
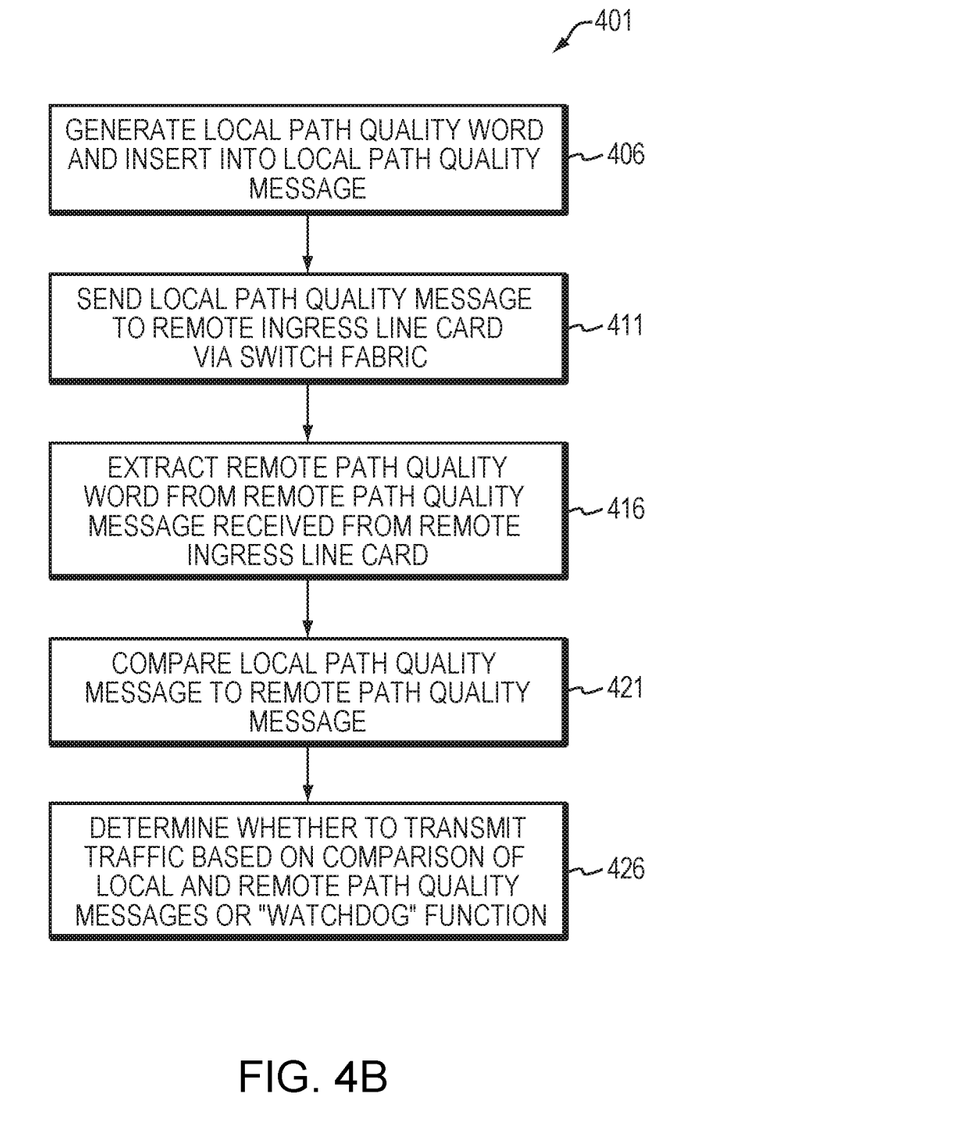
FIG. 4B is a detailed flow diagram illustrating an embodiment of a procedure line cards can use to determine whether to transmit traffic based on a comparison of path quality words.

FIG. 4B is a detailed flow diagram 401, similar to FIG. 4A, also illustrating how line cards, such as the ingress line card 310 of FIG. 3, can determine whether to transmit traffic based on a comparison of PQWs, according to an example embodiment of the present invention. According to the example embodiment, a method 401 of an ingress line card's switching traffic includes generating a local PQW and inserting it into a local PQM (406) and sending the local PQM to a remote ingress line card via a switch fabric (411). The method further includes comparing the local PQW to a remote PQW received from the remote ingress line card and extracted from a remote PQM (416, 421) and then determining whether to transmit traffic to the switch fabric based on the comparison of the local and remote PQWs (426) or using a "watchdog" function, as described above.

Figure 5:
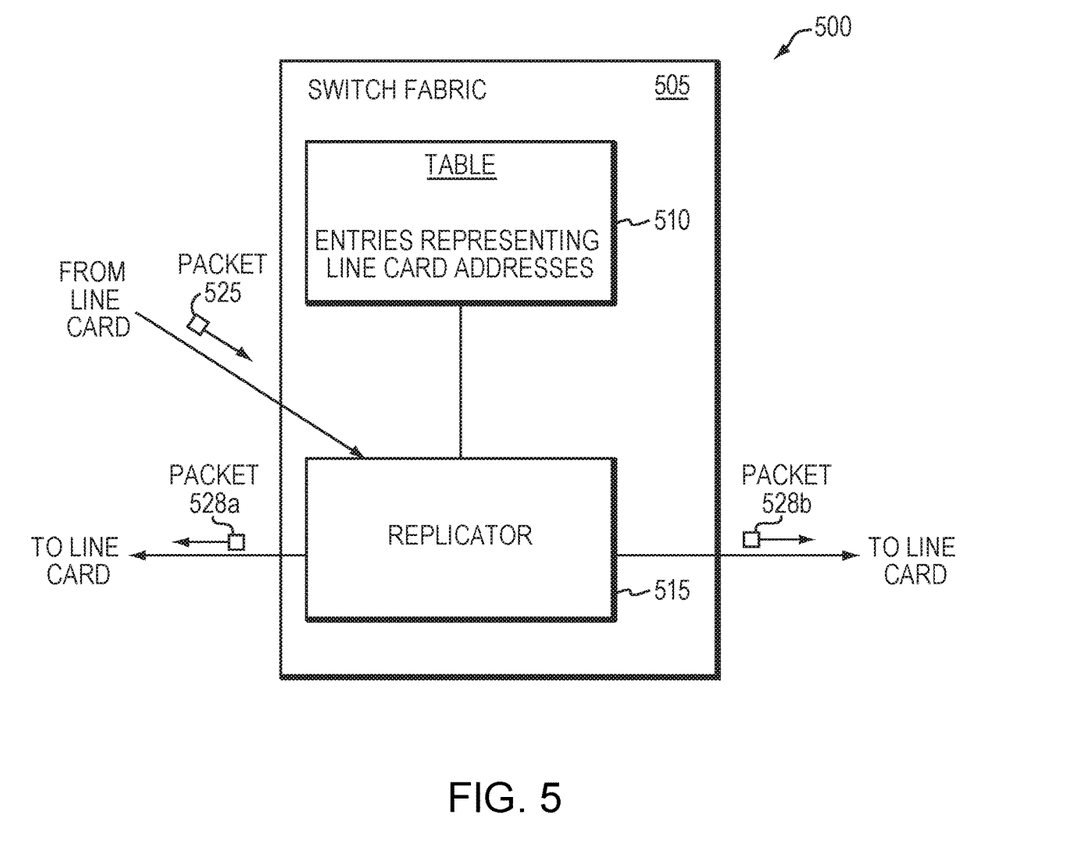
FIG. 5 is a block diagram illustrating a switch fabric that includes an address table and a replicator.

FIG. 5 is a block diagram 500 illustrating a switch fabric 505 including an address table 510 and a replicator 515, according to an example embodiment of the present invention. According to the example embodiment, the switch fabric 505 includes a table 510 with entries representing addresses of line cards and a replicator 515 that replicates packets 525 containing PQWs with respective associated source addresses. The replicator 515 transmits the replicated packets 528a,b to line cards according to the entries in the table 510. The switch fabric 505 need not be aware of the PQWs. In some embodiments, the table 510 may be a multicast table, in which case, the replicator 515 may multicast the replicated packets 528a,b to line cards according to the entries in the multicast table 510. Further, at least some of the packets may include multiple parts that each include a source address and a PQW. The multicasting may be performed in a standard manner of multicasting or may be performed in a customized manner.

Multicasting PQWs has an advantage over multiple independent messagings because of reduced overhead traffic. In this case, one PQW per ingress line card can be sent into the switch fabric 505, and multiple PQWs can be transmitted to the ingress line cards. For example, in the case of eight ingress line cards, eight local PQWs can be sent to the switch fabric 505 (i.e., one for each ingress line card), and sixty-four PQWs can be sent out from the switch fabric 505 to the ingress line cards. This is a reduction from seven to one PQWs in the upstream direction from each line card at an expense of just one more PQW in the downstream direction to each line card, for a net bandwidth savings. To further increase bandwidth savings, multiple PQWs can be batched into a PQM. The replicator 575 may perform multicasting in a manner described in U.S. Pat. No. 7,639,685, the entire teachings of which are incorporated herein by reference in their entirely.

Figure 6:
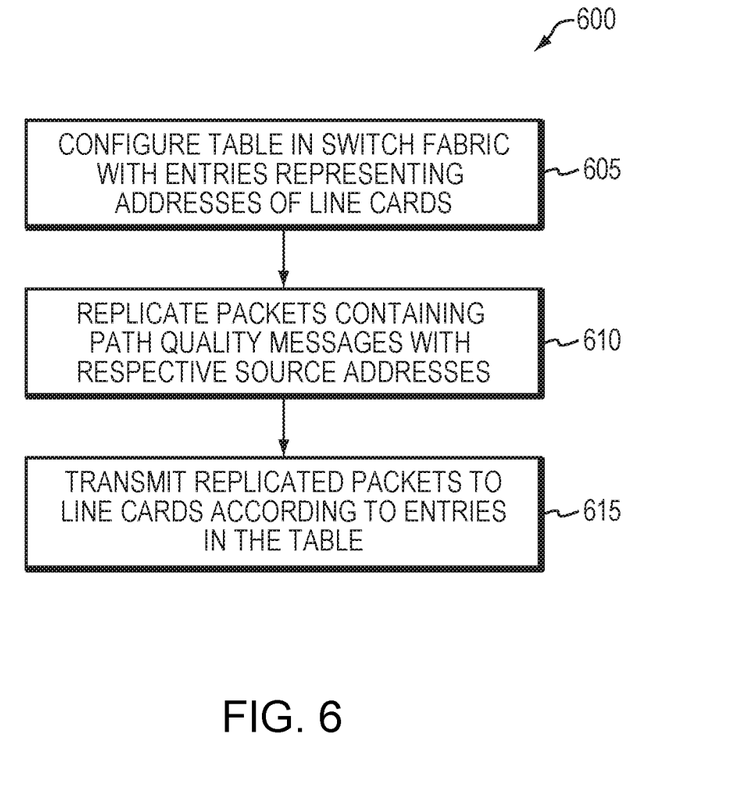
FIG. 6 is a flow diagram illustrating an embodiment of a procedure a switch fabric can use to replicate path quality words.

FIG. 6 is a flow diagram 600 illustrating replication of PQWs in a switch fabric, according to an example embodiment of the present invention. According to the example embodiment, the flow diagram 600 includes configuring a table in the switch fabric, such as the table 510 in FIG. 5, with entries representing addresses of line cards (605). The switch fabric (e.g., switch fabric 505) then replicates packets containing PQWs with respective associated source addresses (610) and transmits the replicated packets to the line cards according to the entries in the table (615).

Figure 7:
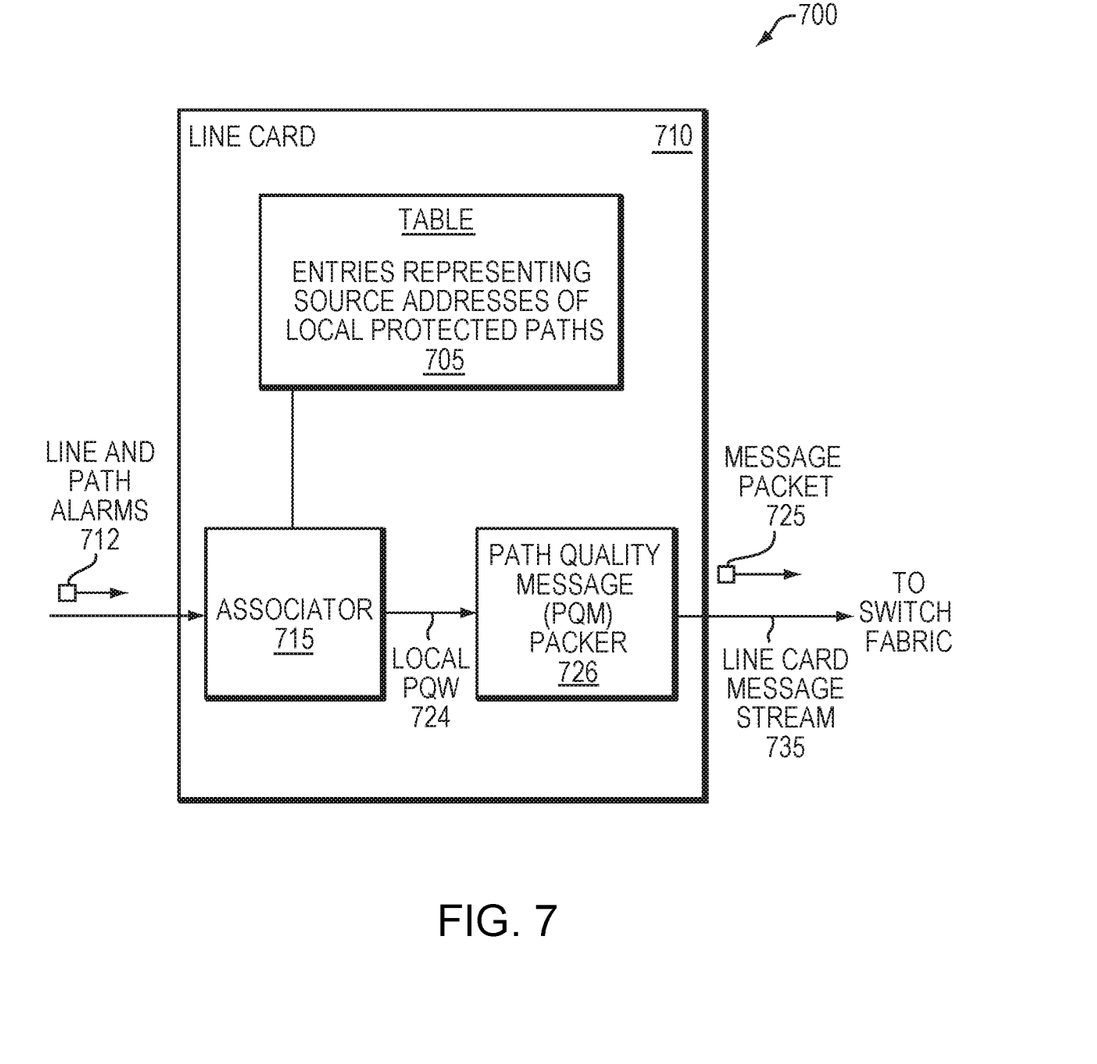
FIG. 7 is a block diagram illustrating a line card that includes an address table and an associator.

FIG. 7 is a block diagram 700 illustrating a line card 710 including an address table 705 and an associator 715, according to an example embodiment of the present invention. According to the example embodiment, the line card 710 includes a table 705 with entries representing source addresses of local ingress paths on which local traffic can be received, and an associator 715 that generates a message packet 725 with an entry and a PQW. The PQW may be based on line and path alarms 712. The entry of the message packet 725 is based on the source addresses entries of the table 705 and, in some embodiments, may be a multicast address. Additionally, the associator 715 transmits the message packet 725 into a line card message stream 735 to be transmitted to a switch fabric, where the switch fabric is known to be configured to inspect the message packet 725 and direct the message packet 725 to a line card corresponding to the entry in the message packet. In some embodiments, the message packets may include multiple parts that each include a PQW and are packed together using a PQM packer 726. In some embodiments, the line card 710 may include a defect monitor, which monitors for actual or user-created defects on which to base the creation of PQWs.

Figure 8:
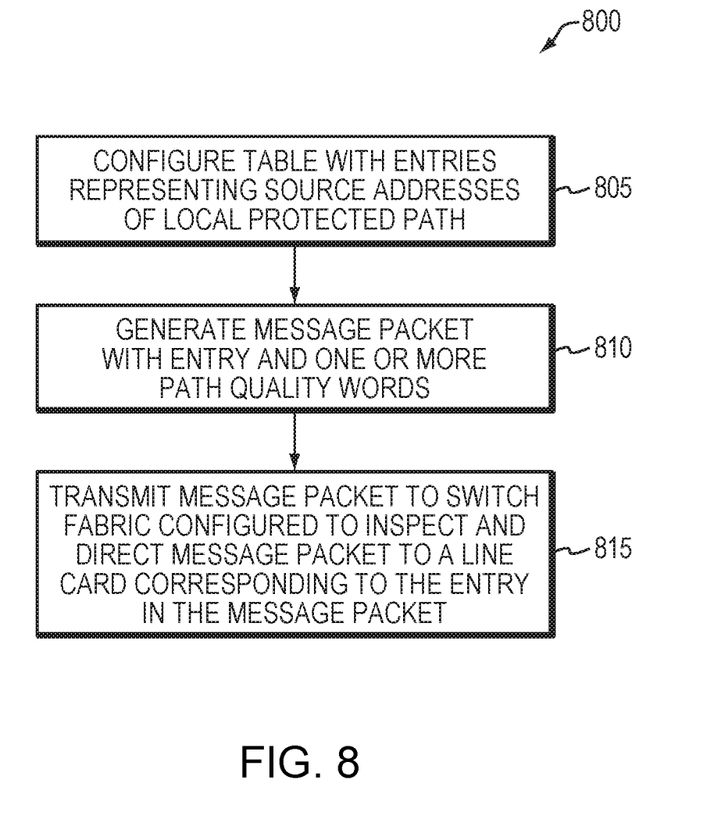
FIG. 8 is a flow diagram illustrating an embodiment of a procedure line cards can use to generate a message packet and transmit the message packet to a switch fabric.

FIG. 8 is a flow diagram 800 illustrating a method by which a line card, such as the line card 710 of FIG. 7, can generate a message packet (e.g., PQM) and transmit the message packet to a switch fabric, according to an example embodiment of the present invention. According to the example embodiment, the flow diagram 800 generates message packets by configuring a table with entries representing source addresses of local protected paths on which local traffic can be received (805). The line card then generates message packets with an entry (e.g., PQW) (810), and thereafter transmits the PQW to a switch fabric configured to inspect the message packet, which, in turn, directs the message packet to a line card corresponding to the entry in the message packet (815). The line card may generate the PQW using a table that includes a list of defects and how the defects should be denoted in the PQW.

Figure 9:
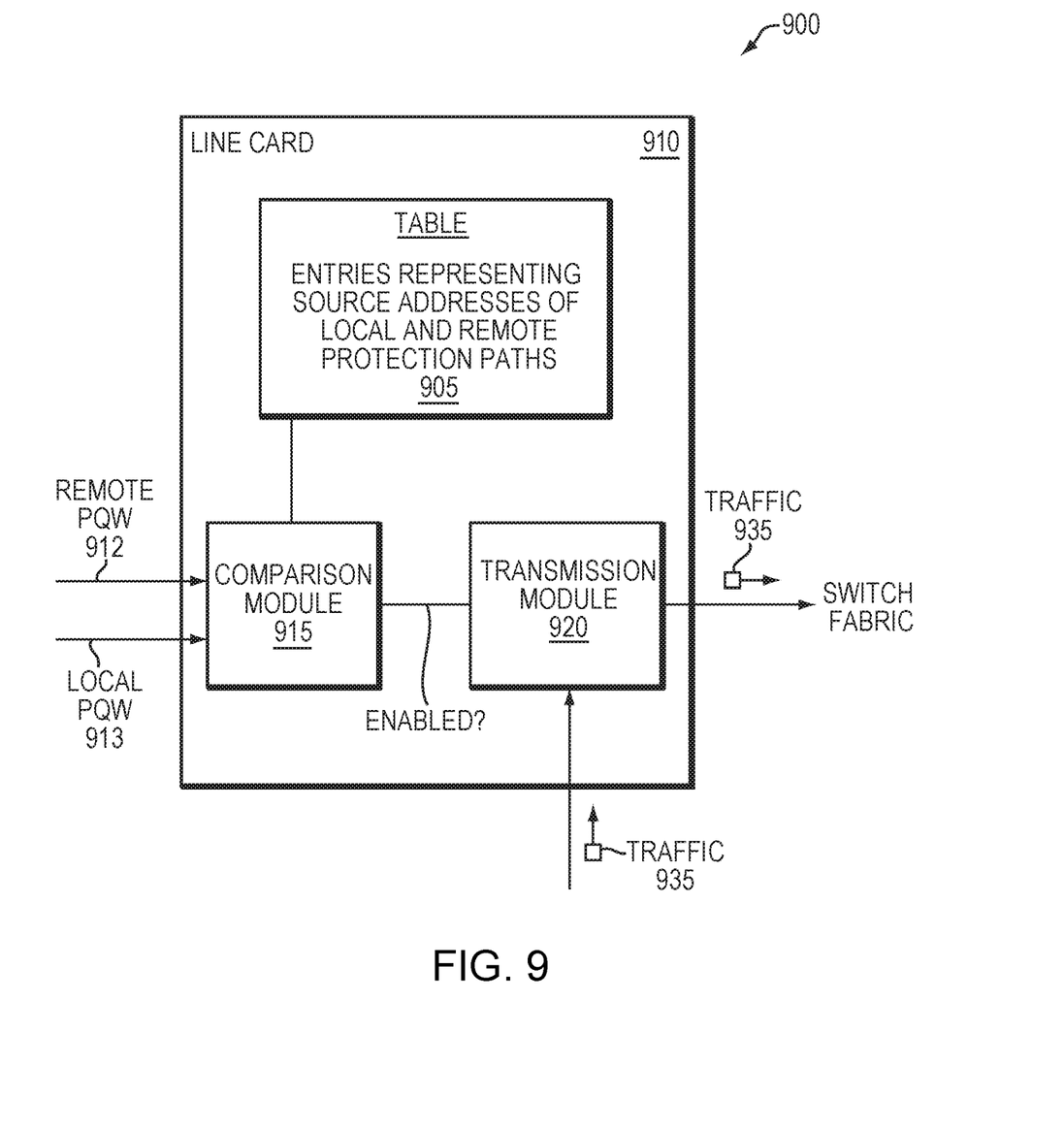
FIG. 9 is a block diagram illustrating a line card that includes an address table, comparison module, and transmission module.

FIG. 9 is a block diagram 900 illustrating a line card 910 including an address table 905, comparison module 915, and transmission module 920, according to an example embodiment of the present invention. According to the example embodiment, the line card 910 includes the table 905, with entries representing source addresses of local and remote protection paths, and the comparison module 915, which compares PQWs (e.g., local and remote PQWs 912, 913) representing qualities of local and remote protected paths. The comparison module 915 causes a local traffic transmission module 920 to enable or disable transmission of received local traffic 935 based on the comparison and the entries of the table 905.

Figure 10:
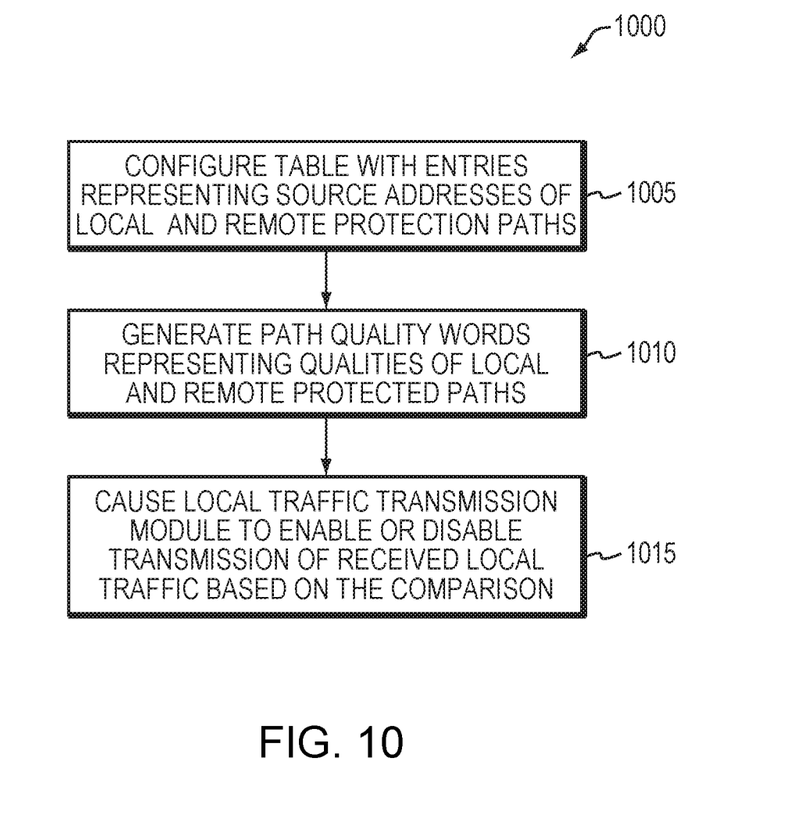
FIG. 10 is a flow diagram illustrating an embodiment of a procedure a line card can use to cause traffic to be transmitted based on a comparison of path quality words.

FIG. 10 is a flow diagram 1000 illustrating how a line card, such as the line card 910 of FIG. 9, causes traffic to be transmitted based on a comparison of PQWs, according to an example embodiment of the present invention. According to the example embodiment, the flow diagram 1000 enables and disables traffic transmission by configuring a table with entries representing source addresses of local and remote protection paths (1005). PQWs representing qualities of local and remote protected paths are then compared (1010), and transmission of received local traffic is enabled or disabled based on the comparison and the entries of the table (1015). In some embodiments, the PQWs may represent defects created by users to facilitate manual protection switches. In some embodiments, a "watchdog" function may be used to determine whether the line card is to transmit traffic. Additionally, after the determination, the line card's traffic may be squelched if it is determined that it is not to transmit traffic.

While this invention has been particularly shown and described with references to example embodiments thereof, it will be understood by those skilled in the art that various changes in form and details may be made therein without departing from the scope of the invention encompassed by the appended claims. It should be understood that the flow diagrams of FIGS. 4A, 4B, 6, 8, and 10 are examples that can include more or fewer components, be partitioned into subunits, or be implemented in different combinations. Moreover, the flow diagrams may be implemented, for example, in hardware, firmware, field programmable gate arrays (FPGAs), or software. If implemented in software, the software may be written in any software language suitable for use in switching domains, switch fabrics, and line cards as illustrated in FIGS. 1-3B, 5, 7, and 9. The software may be embodied on any form of non-transient computer readable medium, such as RAM, ROM, or magnetic or optical disk, and loaded and executed by generic or custom processor(s).

Further, while embodiments have been illustrated in the context of network elements, including line cards and switch fabrics, it should be understood that the example embodiments can also be applied to a network at a macro-level, such as between networks using different communications protocols and an inter-working node there-between, where ingress networks may employ the inter-working node to allow each ingress network to determine which is providing traffic with the better quality (or other metric) such that two or more ingress networks can provide one (or more) streams of traffic to an egress network via the inter-working node. Similarly, the example embodiments can be employed at a micro-level, such as in a handheld device having multiple input-output devices (e.g., chips) in operative communication with each other via an arbitrator or switching device. For purposes of this description and the following claims, networks, line cards, electronic devices, and inter-working nodes, switch fabrics, and electronic devices are equivalent other than their respective scales.

What is claimed is:

1. An apparatus for switching traffic, the apparatus comprising:
   a message generator at a local ingress line card configured to generate a local path quality word and to send the local path quality word to at least one remote ingress line card via a switch fabric;
   a comparator at the local ingress line card configured to:
      compare the local path quality word to a remote path quality word received from a corresponding one of the at least one remote ingress line card; and
      determine whether to transmit traffic from the local ingress line card to the switch fabric based on the comparison of the local path quality word to the remote path quality word.

2. The apparatus of claim 1, wherein the comparator is further configured to determine whether to transmit the traffic based on whether the local path quality word represents a higher path quality than the remote path quality word.

3. The apparatus of claim 1, further comprising:
   a table configured with entries representing source addresses of local and remote protection paths, lines or both;
   wherein the comparator is further configured to cause a local traffic transmission module to enable or disable transmission of received local traffic based on the comparison and the entries of the table.

4. The apparatus of claim 1, wherein the local path quality word represents a quality of received ingress traffic.

5. The apparatus of claim 1, wherein the message generator is further configured to multicast the local path quality word to a plurality of line cards in operative communication with the switch fabric.

6. The apparatus of claim 5, wherein the message generator multicasts the local path quality word based on a table configured with entries representing addresses of the ingress line card and the at least one remote line card.

7. The apparatus of claim 6, wherein the entries comprise source addresses of local ingress paths on which local traffic can be received.

8. The apparatus of claim 6, wherein the table is stored at the ingress line card.

9. The apparatus of claim 6, wherein the table is stored at the switch fabric.

10. The apparatus of claim 6, wherein the table is a multicast table.

11. The apparatus of claim 1, wherein the traffic includes packets including multiple parts, each part including a source address and one or more path quality words.

12. The apparatus of claim 1, wherein the comparator is further configured to determine, independently of the corresponding one of the at least one remote ingress line card, whether to transmit traffic for a protected path, line, or both based on whether the local path quality word represents a higher path quality than the remote path quality word.

13. The apparatus of claim 1, wherein the comparator is further configured to indicate approval to transmit traffic if the remote path quality word is not received from the corresponding one of the at least one remote line card within a predetermined interval.

14. The apparatus of claim 1, wherein the comparator is further configured to cause a transmitter to squelch traffic.

15. The apparatus of claim 1, wherein the message generator is further configured to batch the local path quality word together with another local path quality word before sending.

16. The apparatus of claim 1, wherein the comparator is further configured to extract the remote path quality word from a message including other remote path quality words.

17. The apparatus of claim 16, wherein the message includes at least one packet.

18. A system for switching traffic, the system comprising:
   a switch;
   a first ingress line card; and
   a second ingress line card configured to:
      generate a first path quality word;
      send the first path quality word to at least the first ingress line card via the switch;
      compare the first path quality word to a second path quality word received from the first ingress line card; and
      determine whether to transmit traffic from the second ingress line card to the switch based on the comparison.

19. The system of claim 18, wherein the determination determines whether the first path quality word represents a higher path quality than a path quality represented by the second path quality word.

20. The system of claim 18, wherein the system further comprises a table configured with a plurality of entries each representing an address of at least one of:
   a respective path among a plurality of paths;
   a respective line among a plurality of lines;
   a respective line card among a plurality of line cards;
   wherein the system is further configured to:

use the addresses of the table to multicast the first path quality word.

21. The system of claim 18, wherein the system is further configured to cause a traffic transmission module to, based on the comparison, at least one of:
   enable transmission of received traffic;
   disable transmission of received traffic.

22. A network element for switching traffic, the network element comprising:
   a switch fabric;
   a first ingress line card; and
   a second ingress line card configured to:
      generate a first path quality word;
      send the first path quality word to at least the first ingress line card via the switch fabric;
      compare the first path quality word to a second path quality word received from the first ingress line card; and
      determine whether to transmit traffic from the second ingress line card to the switch fabric based on the comparison.

23. The network element of claim 22, wherein the determination determines whether the first path quality word represents a higher path quality than a path quality represented by the second path quality word, and wherein the network element further comprises a table configured with a plurality of entries each representing an address of at least one of:
   a respective path among a plurality of paths;
   a respective line among a plurality of lines;
   a respective line card among a plurality of line cards;
   wherein the network element is further configured to:
   use the addresses of the table to multicast the first path quality word; and
   cause a traffic transmission module to, based on the comparison, at least one of:
      enable transmission of received traffic;
      disable transmission of received traffic.

* * * * *